(12) United States Patent
Takeda et al.

(10) Patent No.: US 8,161,734 B2
(45) Date of Patent: Apr. 24, 2012

(54) EXHAUST GAS PURIFICATION DEVICE

(75) Inventors: Hideto Takeda, Kariya (JP); Akihiro Matsuyama, Kariya (JP); Noriyuki Kobayashi, Ichinomiya (JP); Yugo Osaka, Nagoya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 331 days.

(21) Appl. No.: 12/464,293

(22) Filed: May 12, 2009

(65) Prior Publication Data

US 2009/0277163 A1 Nov. 12, 2009

(30) Foreign Application Priority Data

May 12, 2008 (JP) .................. 2008-124412

(51) Int. Cl.
*F01N 3/00* (2006.01)
(52) U.S. Cl. .......................... 60/295; 60/301
(58) Field of Classification Search .................. 60/286, 60/288, 299, 301, 303
See application file for complete search history.

(56) References Cited

U.S. PATENT DOCUMENTS

| | | | |
|---|---|---|---|
| 5,472,673 A | 12/1995 | Goto et al. | |
| 6,048,821 A | 4/2000 | Demmel et al. | |
| 6,074,984 A | 6/2000 | Demmel et al. | |
| 6,281,164 B1 | 8/2001 | Demmel et al. | |
| 6,338,831 B1 * | 1/2002 | Strehlau et al. | 423/244.07 |
| 2003/0049191 A1 * | 3/2003 | Twigg | 423/244.07 |

FOREIGN PATENT DOCUMENTS

| | | |
|---|---|---|
| JP | 11-303625 | 11/1999 |
| JP | 2007231922 A * | 9/2007 |
| JP | 2008-002359 | 1/2008 |
| JP | 2008-075585 | 4/2008 |
| JP | 2009-041441 | 2/2009 |
| JP | 2009-108699 | 5/2009 |
| JP | 2009-228525 | 10/2009 |

OTHER PUBLICATIONS

Japanese Office Action dated Mar. 5, 2010, issued in corresponding Japanese Application No. 2008-124412, with English translation.
Takamitsu et al., "Development of PM and NOx Simultaneous-Reduction System in Diesel Exhaust Gas with sulfur trap catalyst", *Automotive Technology Symposium*, Jan. 24, 2007, pp. 27-31 (w/ Partial translation—p. 29, line 12—p. 30, line 13).

* cited by examiner

*Primary Examiner* — Thomas Denion
*Assistant Examiner* — Patrick Maines
(74) *Attorney, Agent, or Firm* — Nixon & Vanderhye P.C.

(57) ABSTRACT

An exhaust gas purification device includes an exhaust pipe defining an exhaust passage, a first $SO_X$ adsorption portion having a first $SO_X$ adsorption material provided in the exhaust passage, a second $SO_X$ adsorption portion having a second $SO_X$ adsorption material provided in the exhaust passage, and a $NO_X$ catalyst provided downstream of the first $SO_X$ adsorption portion and the second $SO_X$ adsorption portion in the exhaust passage. The first $SO_X$ adsorption material is configured to adsorb $SO_X$ in the combustion gas at a temperature lower than a first set temperature. The second $SO_X$ adsorption material is configured to store $SO_X$ in the combustion gas at a temperature equal to or higher than a second set temperature, and the stored $SO_X$ can be kept at a temperature lower than the second set temperature. Therefore, the exhaust gas purification device can adsorb $SO_X$ in the exhaust gas with high efficiency.

14 Claims, 12 Drawing Sheets

EXHAUST GAS PURIFICATION DEVICE

CROSS REFERENCE TO RELATED APPLICATION

The present application is based on Japanese Patent Application No. 2008-124412 filed on May 12, 2008, the disclosure of which is incorporated herein by reference in its entirely.

FIELD OF THE INVENTION

The present invention relates to an exhaust gas purification device having a $SO_X$ adsorption material for purifying sulfur oxide (hereinafter referred to as $SO_X$) in exhaust gas, which is combustion gas discharged from an internal combustion engine.

BACKGROUND OF THE INVENTION

Figure 18:
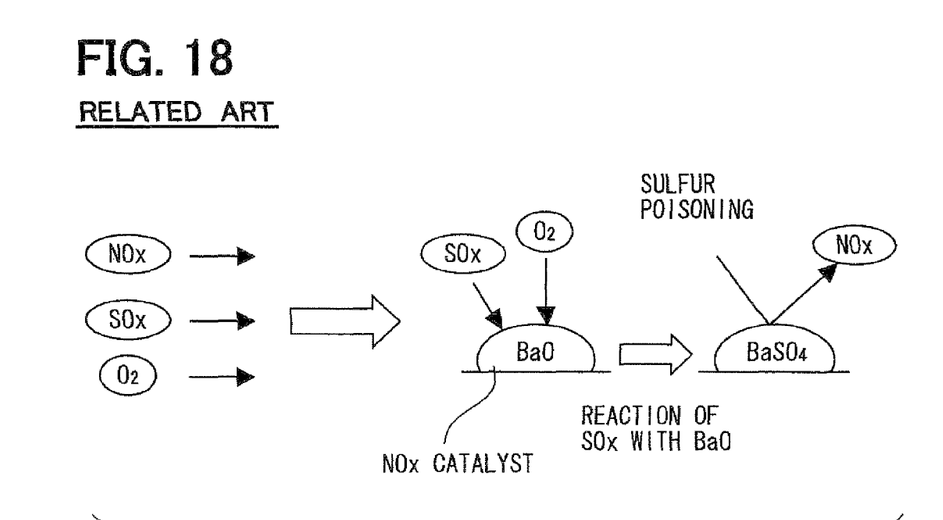
FIG. 18 is a schematic diagram illustrating sulfur poisoning of a $NO_X$ catalyst.

In order to purify exhaust gas discharged from an internal combustion engine, an exhaust gas purification device having a $NO_X$ catalyst for absorbing $NO_X$ in an exhaust passage is known. Because fuel includes sulfur, sulfur poisoning occurs as shown in FIG. 18. That is, the sulfur poisoning is the phenomenon that sulfur component of fuel included in the exhaust gas is adsorbed after long-term use of the internal combustion engine. Thereby, the purification ability of the $NO_X$ catalyst by the exhaust gas purification device may be decreased distinctly. In order to prevent sulfur poisoning of the $NO_X$ catalyst, the exhaust gas purification device described in JP-A-6-058138 corresponding to U.S. Pat. No. 5,472,673 has a sulfur trap for adsorbing $SO_X$ in the exhaust gas provided upstream of the $NO_X$ catalyst in an exhaust passage.

However, the above exhaust gas purification device includes only one sulfur trap. Thus, when the exhaust gas purification device is used in a diesel engine under a wide range of temperature, such as 100° C. to 700° C., for example, $SO_X$ cannot be removed sufficiently.

SUMMARY OF THE INVENTION

In view of the above-described difficulty, it is an object of the present invention to provide an exhaust gas purification device that can adsorb $SO_X$ in exhaust gas with high efficiency.

According to an aspect of the present disclosure, an exhaust gas purification device includes an exhaust pipe defining an exhaust passage configured to discharge combustion gas from a combustion chamber of an internal combustion engine; a first $SO_X$ adsorption portion having a first $SO_X$ adsorption material, provided in the exhaust passage; a second $SO_X$ adsorption portion having a second $SO_X$ adsorption material, provided in the exhaust passage; and a $NO_X$ catalyst provided downstream of the first $SO_X$ adsorption portion and the second $SO_X$ adsorption portion in the exhaust passage. The $NO_X$ catalyst is configured to absorb $NO_X$ in the combustion gas to purify the combustion gas. The first $SO_X$ adsorption material is configured to adsorb $SO_X$ in the combustion gas at a temperature lower than a first set temperature. The second $SO_X$ adsorption material is configured to store $SO_X$ in the combustion gas at a temperature equal to or higher than a second set temperature, and the stored $SO_X$ can be kept at a temperature lower than the second set temperature.

In the above configuration, the exhaust gas purification device can adsorb $SO_X$ in the exhaust gas with high efficiency in a wide range of temperature. Therefore, a $NO_X$ catalyst can be avoided from sulfur poisoning, and the lowering of the purification ability of the $NO_X$ catalyst can be prevented.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Hereinafter, embodiments of the present invention will be described with reference to the drawings.

First Embodiment

Figure 1:
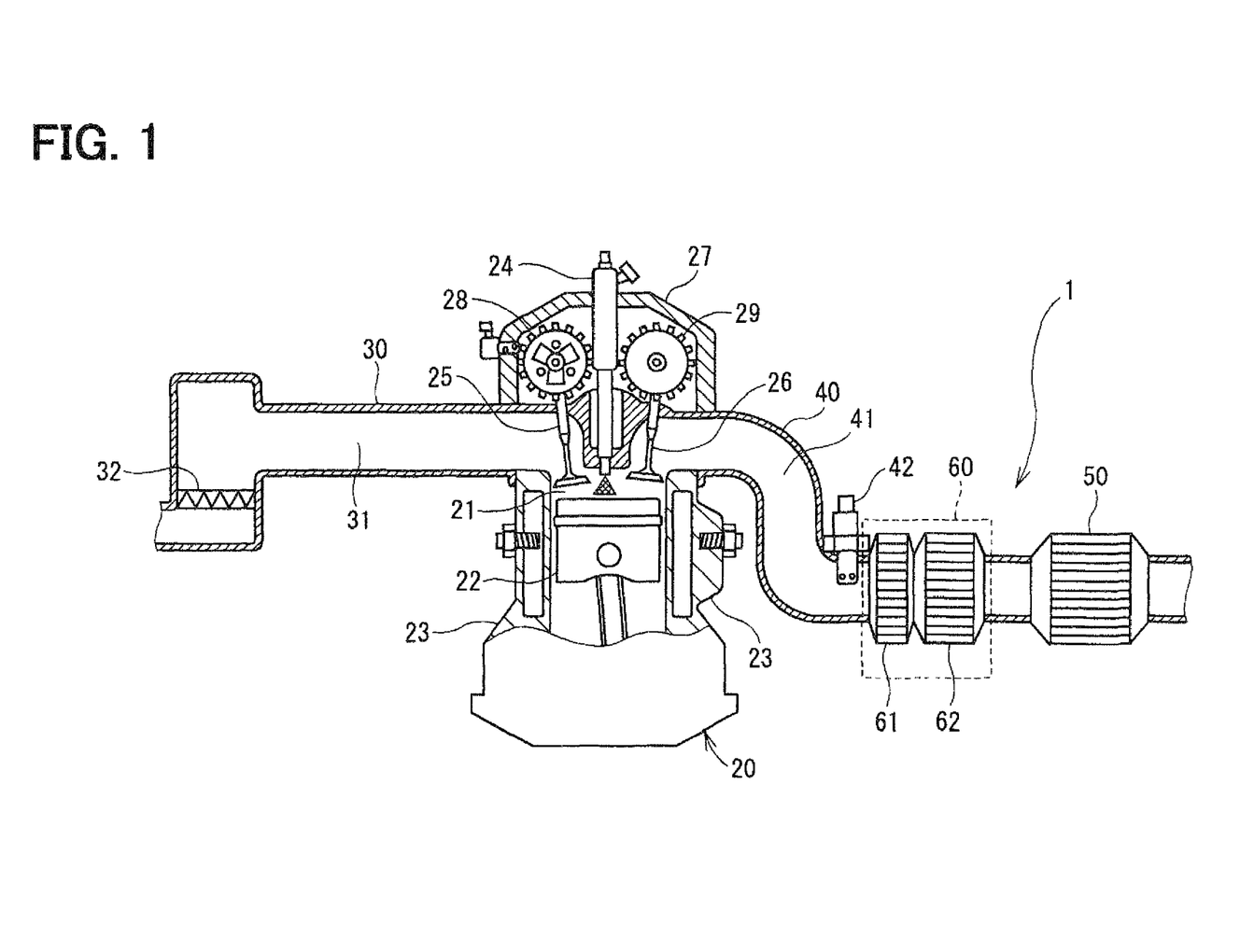
FIG. 1 is a cross-sectional view showing an exhaust gas purification device according to a first embodiment of the present invention.

FIG. 1 shows an exhaust gas purification device of an internal combustion engine according to a first embodiment of the present invention. Although the exhaust gas purification device of the first embodiment is applied to a four-cylinder diesel engine, only one cylinder is shown for simplification in FIG. 1. An exhaust gas purification device 1 purifies harmful components such as $SO_X$, $NO_X$, particles and the like in exhaust gas flowing in an exhaust passage 41 that is configured by an exhaust pipe 40 of an internal combustion engine 20.

The internal combustion engine 20 includes a combustion chamber 21, a piston 22 and an injector 24 in respective cylinders. The combustion chamber 21 is defined by an inner wall of a cylinder 23, an upper end surface of the piston 22 that is held in the cylinder 23 and reciprocates, and lower end surfaces of an inlet valve 25 and an outlet valve 26. Volume of the combustion chamber 21 is increased and decreased by the reciprocating movement of the piston 22. The combustion chamber 21 is connected to an intake pipe 30 via the inlet valve 25, and intake air having passed through an air filter 32 flows into an intake passage 31 that is configured by the intake pipe 30. The combustion chamber 21 is connected to the exhaust pipe 40 via the outlet valve 26, and discharges the exhaust gas. The intake air flowing from the intake passage 31 into the combustion chamber 21 is shut or permitted by the inlet valve 25, and the exhaust gas flowing from the combustion chamber 21 into the exhaust passage 41 is shut or permitted by the outlet valve 26.

The injector 24 is connected to a common rail that stores high pressure fuel and injects the high pressure fuel supplied from the common rail into the combustion chamber 21. The common rail is not shown in the drawing. Gears 28, 29 held in a head cover 27 and a gear fixed to a crankshaft, which is not shown in the drawing, are wound by a chain, which is not shown in the drawing. Each of the gears 28, 29 is connected to a camshaft, which is not shown in the drawing. Thereby, driving force of the crankshaft is transmitted to the camshaft via the chain and the gears 28, 29 so that the inlet valve 25 and the outlet valve 26 are opened or closed.

In the exhaust pipe 40, there is provided with a temperature sensor 42 for detecting a temperature of the exhaust gas, a $NO_X$ catalyst 50, and a $SO_X$ adsorption portion 60 provided upstream of the $NO_X$ catalyst 50. The $NO_X$ catalyst 50 purifies $NO_X$ in the exhaust gas into $N_2$. In the present embodiment, a $NO_X$ storage-reduction catalyst is used. By using the $NO_X$ storage-reduction catalyst, $NO_X$ is absorbed in the catalyst in nitrate salt form during a lean driving mode, and the nitrate salt is reduced into $N_2$ under a reduction atmosphere, in which oxygen concentration is decreased.

Figure 2:
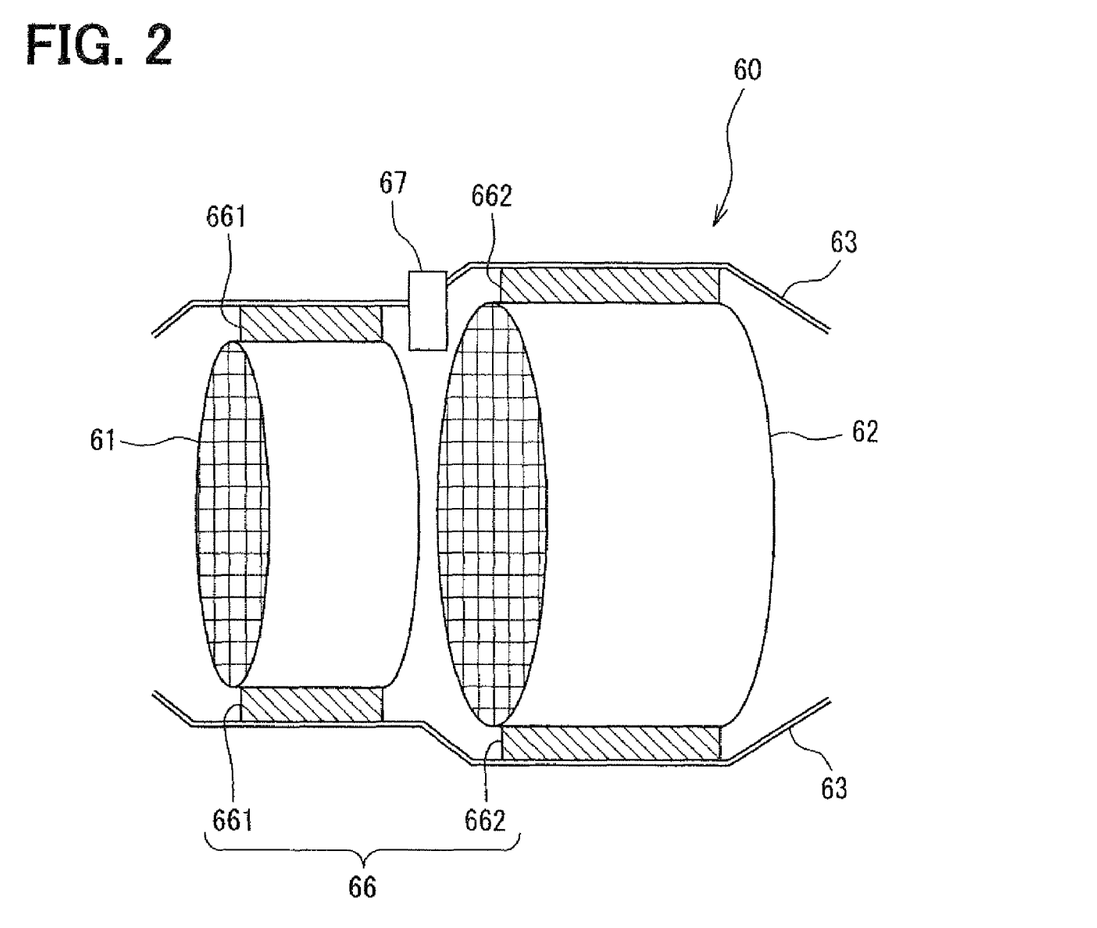
FIG. 2 is a schematic view showing a $SO_X$ adsorption portion used for the exhaust gas purification device according to the first embodiment of the present invention.

As shown in FIG. 2, the $SO_X$ adsorption portion 60 includes a first $SO_X$ adsorption portion 61, a second $SO_X$ adsorption portion 62, a casing 63, a heater 66 and a $SO_X$ sensor 67. The casing 63 holds therein the first $SO_X$ adsorption portion 61 provided upstream and the second $SO_X$ adsorption portion 62 provided downstream. The heater 66 includes a first heater 661 as a first heating portion for heating the first $SO_X$ adsorption portion 61 and a second heater 662 as a second heating portion for heating the second $SO_X$ adsorption portion 62. The first heater 661 is provided at an outer surface of the first $SO_X$ adsorption portion 61, and the second heater 662 is provided at an outer surface of the second $SO_X$ adsorption portion 62. The $SO_X$ sensor 67 is located between the first $SO_X$ adsorption portion 61 and the second $SO_X$ adsorption portion 62 that are spaced by a predetermined distance, and detects $SO_X$ concentration in the exhaust gas. In the example of FIG. 2, each of the first and second $SO_X$ adsorption portions 61, 62 is a cylindrical shape, and the diameter of the second $SO_X$ adsorption portion 62 is larger than that of the first $SO_X$ adsorption portion 61.

Figure 3:
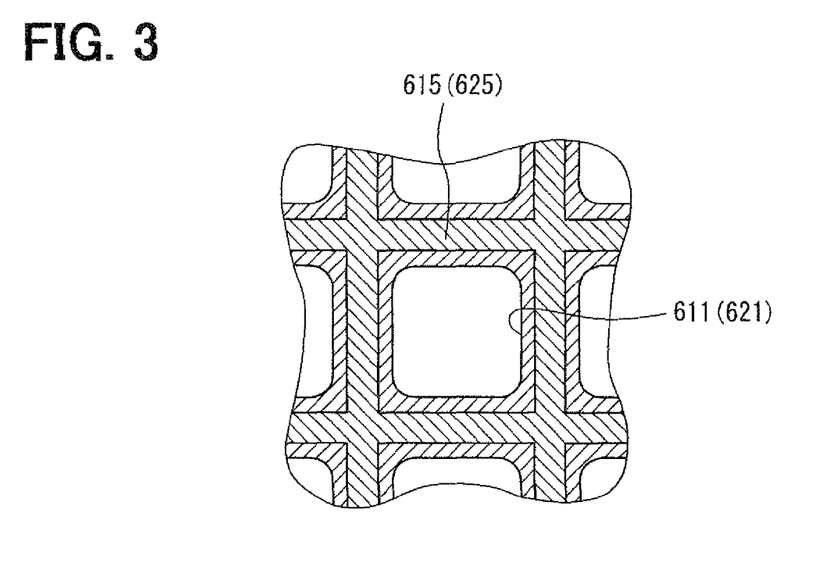
FIG. 3 is an enlarged schematic view showing the $SO_X$ adsorption portion used for the exhaust gas purification device according to the first embodiment of the present invention.

FIG. 3 is an enlarged schematic view of the first $SO_X$ adsorption portion 61. The first $SO_X$ adsorption portion 61 is configured to be a honey-comb structure, and a first $SO_X$ adsorption material 611 is supported by a support member 615 to form the first $SO_X$ adsorption portion 61. Similarly, the second $SO_X$ adsorption portion 62 is configured to be a honey-comb structure, and a second $SO_X$ adsorption material 621 is supported by a support member 625 to form the second $SO_X$ adsorption portion 62. The first $SO_X$ adsorption material 611 combines with $SO_X$ in the exhaust gas when the exhaust gas temperature is lower than 500° C., and the first $SO_X$ adsorption material 611 desorbs the combined $SO_X$ when the exhaust gas temperature is equal to or higher than 500° C. The second $SO_X$ adsorption material 621 downstream of the first $SO_X$ adsorption material 611 adsorbs $SO_X$ in the exhaust gas and the desorbed $SO_X$ from the first $SO_X$ adsorption material 611 when the exhaust gas temperature is equal to or higher than 500° C. The second $SO_X$ adsorption material 621 is set to sufficiently store therein $SO_X$ even when the exhaust gas temperature is decreased to be such as lower than 500° C. Even when a running distance of a vehicle reaches 200000 km, for example, the second $SO_X$ adsorption material 621 can sufficiently adsorb $SO_X$. The first $SO_X$ adsorption material 611 may be sodium compound, and the second $SO_X$ adsorption material 621 may be calcium carbonate in the present embodiment.

Figure 4:
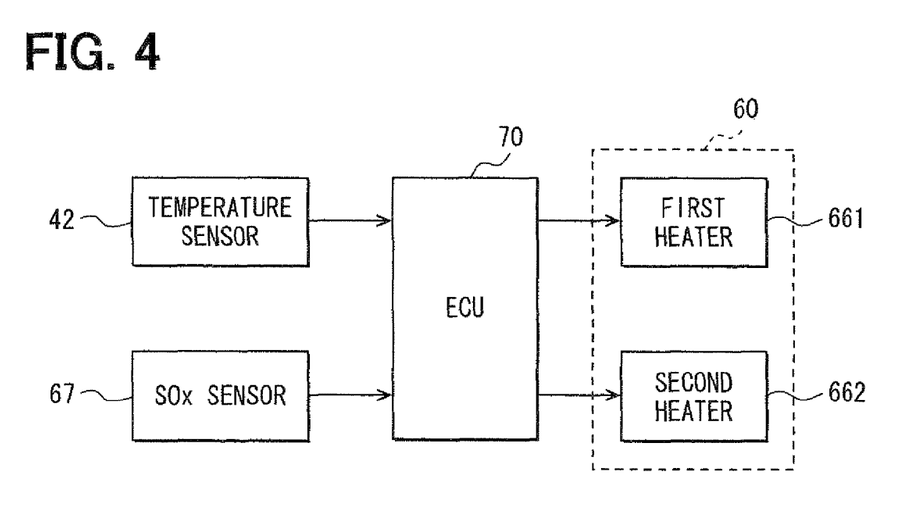
FIG. 4 is a block diagram showing a configuration of the exhaust gas purification device according to the first embodiment of the present invention.

As shown in FIG. 4, the exhaust gas purification device 1 of the present embodiment includes an electric control device 70, which is hereinafter referred to as an ECU. Sensors such as the temperature sensor 42 and the $SO_X$ sensor 67 are connected to the input side of the ECU 70, and the first heater 661, the second heater 662 and the like are connected to the output side of the ECU 70.

Figure 5:
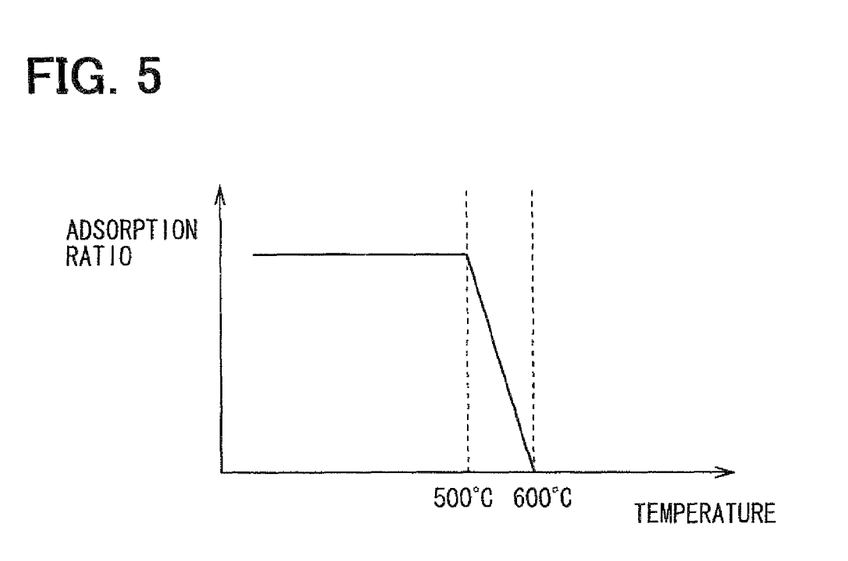
FIG. 5 is a graph showing a property of a first $SO_X$ adsorption material according to the first embodiment of the present invention.

$SO_X$ adsorption property of the $SO_X$ adsorption materials will be described with reference to FIG. 5 and FIG. 6. FIG. 5 is a graph showing the $SO_X$ adsorption property of the first $SO_X$ adsorption material 611. In FIG. 5, the horizontal axis indicates a temperature, and the vertical axis indicates a $SO_X$ adsorption ratio of the first $SO_X$ adsorption material 611. The first $SO_X$ adsorption material 611 adsorbs $SO_X$ efficiently at a temperature lower than 500° C. The $SO_X$ adsorption ratio is decreased at a temperature equal to or higher than 500° C., and the $SO_X$ adsorption ratio becomes 0 at a temperature equal to or higher than 600° C. That is, the first $SO_X$ adsorption material 611 desorbs the adsorbed $SO_X$ at a temperature equal to or higher than 500° C.

Figure 6:
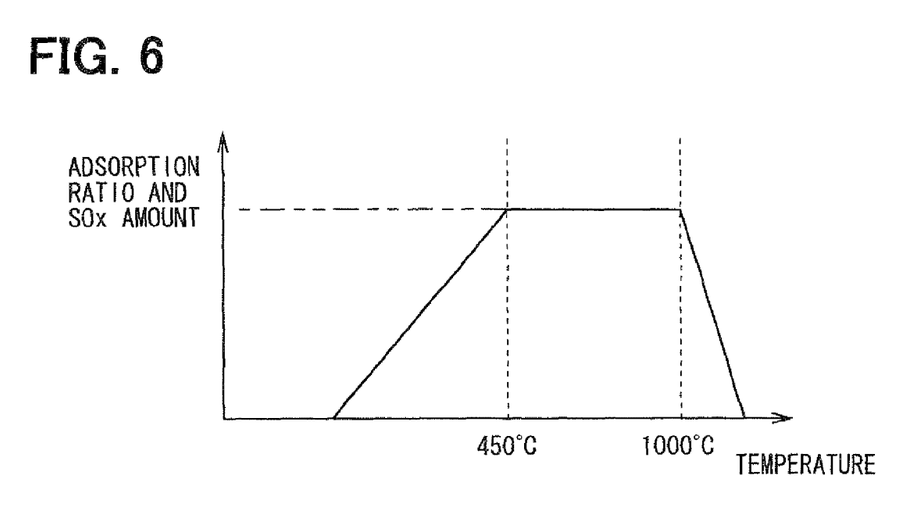
FIG. 6 is a graph showing a property of a second $SO_X$ adsorption material according to the first embodiment of the present invention.

FIG. 6 is a graph showing the $SO_X$ adsorption property of the second $SO_X$ adsorption material 621. In FIG. 6, the horizontal axis indicates a temperature, and the vertical axis indicates a $SO_X$ adsorption ratio of the second $SO_X$ adsorption material 621 in the exhaust gas when the temperature of the second $SO_X$ adsorption material 621 is increased as in the solid line, and the amount of $SO_X$ stored in the second $SO_X$ adsorption material 621 when the temperature of the second $SO_X$ adsorption material 621 is decreased as in the two-dot chain line. As shown by the solid line in FIG. 6, the second $SO_X$ adsorption material 621 adsorbs $SO_X$ efficiently at a temperature equal to or higher than 450° C., and the $SO_X$ adsorption ratio is decreased at a temperature equal to or higher than 1000° C. Because an upper limit of the exhaust gas temperature is generally about 700° C., the second $SO_X$ adsorption material 621 adsorbs $SO_X$ efficiently when the exhaust gas temperature is high. As shown by the two-dot chain line in FIG. 6, the second $SO_X$ adsorption material 621 after adsorbing $SO_X$ at a temperature from 450° C. to 1000° C. does not desorb $SO_X$ but stores therein $SO_X$ even when the temperature is decreased to be lower than 450° C.

Figure 7:
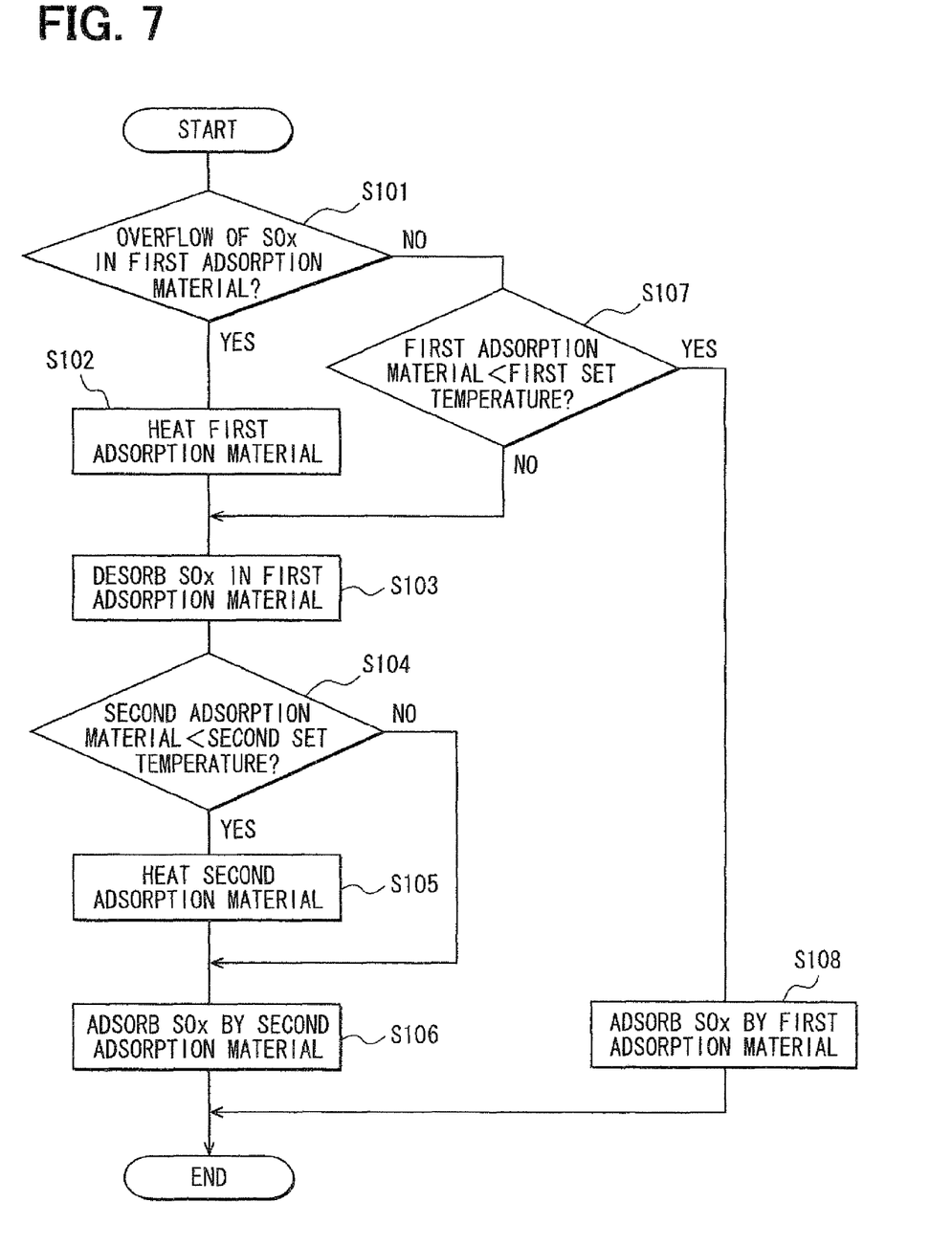
FIG. 7 is a flow diagram for a $SO_X$ adsorption treatment by the exhaust gas purification device according to the first embodiment of the present invention.

According to the present embodiment, sulfur component in the exhaust gas is adsorbed with high efficiency in a wide range of the exhaust gas temperature. The $SO_X$ adsorption treatment by the exhaust gas purification device 1 of the present embodiment will be described with reference to a flow diagram shown in FIG. 7. In FIG. 7, "S" indicates a step. At S101, it is determined whether $SO_X$ overflows in the first $SO_X$ adsorption material 611. Whether $SO_X$ overflows in the first $SO_X$ adsorption material 611 is determined as follows, for example. In case that the $SO_X$ sensor 67 detects $SO_X$ even when the temperature detected by the temperature sensor 42 is lower than 500° C., the overflow of $SO_X$ in the first $SO_X$ adsorption material 611 is determined. When the overflow of $SO_X$ in the first $SO_X$ adsorption material 611 is determined ("YES" at S101), the control process proceeds to S102. When the overflow of $SO_X$ in the first $SO_X$ adsorption material 611 is not determined ("NO" at S101), the control process proceeds to S107.

When $SO_X$ overflows in the first $SO_X$ adsorption material 611, the first $SO_X$ adsorption material 611 is heated by the first heater 661 such that the temperature of the first $SO_X$ adsorption material 611 becomes equal to or higher than 500° C. at S102. When $SO_X$ does not overflow in the first $SO_X$ adsorption material 611, it is determined whether the temperature of the first $SO_X$ adsorption material 611 is lower than a first set temperature at S107. The first set temperature in the present embodiment is 500° C., for example. When the temperature of the first $SO_X$ adsorption material 611 is not lower than the first set temperature ("NO" at S107), that is, when the exhaust gas temperature is high and the temperature of the first $SO_X$ adsorption material 611 is equal to or higher than 500° C., the control process proceeds to S103. When the temperature of the first $SO_X$ adsorption material 611 is lower than the first set temperature ("YES" at S107), that is, when the exhaust gas temperature is low and the temperature of the first $SO_X$ adsorption material 611 is lower than 500° C., the control process proceeds to S108.

When the temperature of the first $SO_X$ adsorption material 611 is equal to or higher than 500° C. ("NO" at S107 or after heating the first $SO_X$ adsorption material 611 at S102), the first $SO_X$ adsorption material 611 desorbs $SO_X$ at S103. That is, because the temperature of the first $SO_X$ adsorption material 611 is equal to or higher than 500° C. at S103, the $SO_X$ adsorption ratio is decreased and the first $SO_X$ adsorption material 611 desorbs $SO_X$.

At S104, it is determined whether the temperature of the second $SO_X$ adsorption material 621 is lower than a second set temperature. When the temperature of the second $SO_X$ adsorption material 621 is lower than the second set temperature ("YES" at S104), that is, when the exhaust gas temperature is low and the temperature of the second $SO_X$ adsorption material 621 is lower than 500° C., the control process proceeds to S105. When the temperature of the second $SO_X$ adsorption material 621 is not lower than the second set temperature, that is, when the exhaust gas temperature is high and the temperature of the second $SO_X$ adsorption material 621 is equal to or higher than 500° C., the control process proceeds to S106.

At S105, the second $SO_X$ adsorption material 621 is heated by the second heater 662 such that the temperature of the second $SO_X$ adsorption material 621 becomes equal to or higher than 500° C. At S106, $SO_X$ in the exhaust gas is adsorbed by the second $SO_X$ adsorption material 621, and the $SO_X$ adsorption treatment is terminated. When it is determined that $SO_X$ does not overflow in the first $SO_X$ adsorption material 611 at S101, and when it is determined that the temperature of the first $SO_X$ adsorption material 611 is lower than the first set temperature at S107 $SO_X$ in the exhaust gas is adsorbed by the first $SO_X$ adsorption material 611 at S108, and the $SO_X$ adsorption treatment is terminated.

The ECU 70 of the present embodiment includes a first temperature control portion and a second temperature control portion. S102 in FIG. 7 corresponds to the control process performed by the first temperature control portion and S105 in FIG. 7 corresponds to the control process performed by the second temperature control portion. As described above, in the present embodiment, $SO_X$ in the exhaust gas is adsorbed by the first $SO_X$ adsorption material 611 when the exhaust gas temperature is low, and $SO_X$ in the exhaust gas is adsorbed by the second $SO_X$ adsorption material 621 when the exhaust gas temperature is high. When $SO_X$ overflows in the first $SO_X$ adsorption material 611 ("YES" at S101), the first $SO_X$ adsorption material 611 is heated at S102 to desorb $SO_X$ at S103, and the second $SO_X$ adsorption material 621 is heated at S105 so that $SO_X$ is adsorbed by the second $SO_X$ adsorption material 621 at S106.

Thereby, in case that the internal combustion engine 20 is a diesel engine and the exhaust gas temperature ranges from 100° C. to 700° C., by using both the first $SO_X$ adsorption material 611 and the second $SO_X$ adsorption material 621, $SO_X$ can be adsorbed efficiently. Therefore, the $NO_X$ catalyst 50 can be avoided from sulfur poisoning, and the lowering of the purification ability of the $NO_X$ catalyst 50 can be prevented.

In the present embodiment, calcium carbonate is used as the second $SO_X$ adsorption material 621. Calcium carbonate has high ability of adsorbing $SO_X$ under high temperature. In addition, calcium carbonate is stable, cheap, and has good recycling efficiency. However, $SO_X$ adsorbing efficiency of calcium carbonate decreases under low temperature. In the present invention, because the first $SO_X$ adsorption material that adsorbs $SO_X$ with high efficiency under low temperature is also used, the above-described difficulty can be overcome. Therefore, calcium carbonate can be used as the second $SO_X$ adsorption material.

Second Embodiment

Next, a second embodiment of the present invention will be described with reference to FIG. 8 to FIG. 13. With respect to the similar portion or corresponding portion with one included in the first embodiment, the same reference numerals are indicated and the description is omitted. In the above-described first embodiment, the first $SO_X$ adsorption portion 61 is provided upstream of the second $SO_X$ adsorption portion 62 in the flow direction of the exhaust gas. In contrast, in an exhaust gas purification device 2 of FIG. 8 according to the second embodiment, a first $SO_X$ adsorption portion 91 and a second $SO_X$ adsorption portion 92, which configure a $SO_X$ adsorption portion 90, are arranged in parallel in the flow direction of the exhaust gas.

Figure 8:
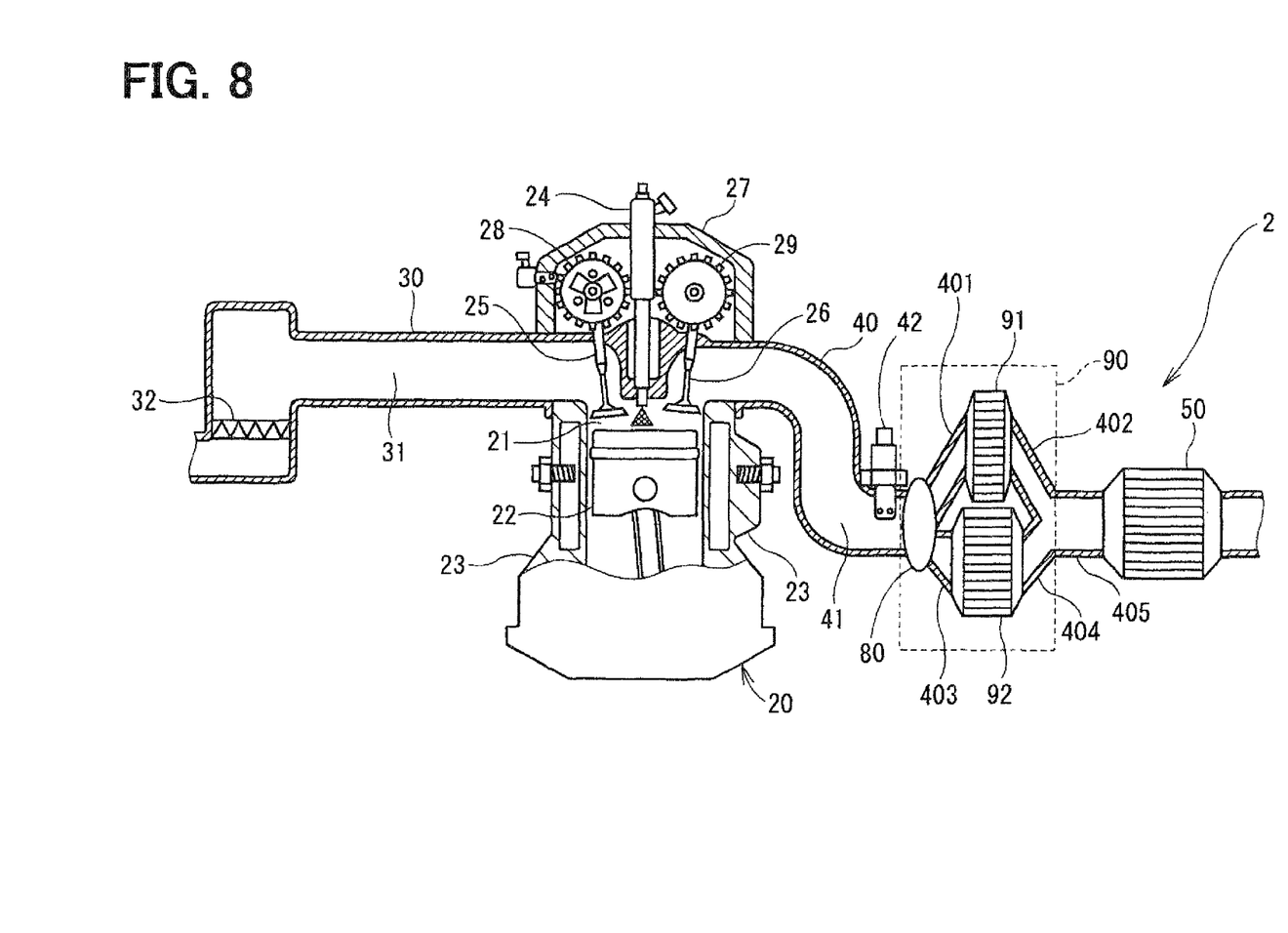
FIG. 8 is a cross-sectional view showing an exhaust gas purification device according to a second embodiment of the present invention.

The exhaust pipe 40 includes a switch valve 80, and the exhaust passage 40 is branched into first branch pipes 401, 402 and second branch pipes 403, 404 such that a flow passage can be switched by the switch valve 80. The first $SO_X$ adsorption portion 91 is provided in the first branch pipes 401, 402, and the second $SO_X$ adsorption portion 92 is provided in the second branch pipes 403, 404. The first branch pipe 402 and the second branch pipe 404 are joined to a junction pipe 405, and the $NO_X$ catalyst 50 is provided at the junction pipe 405.

Figure 9:
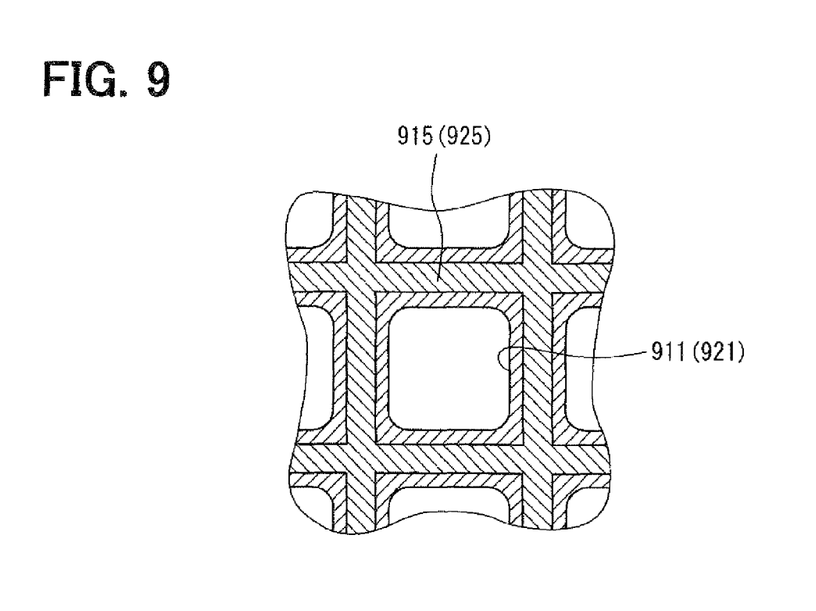
FIG. 9 is an enlarged schematic view showing a $SO_X$ adsorption portion used for the exhaust gas purification device according to the second embodiment of the present invention.
Figure 10:
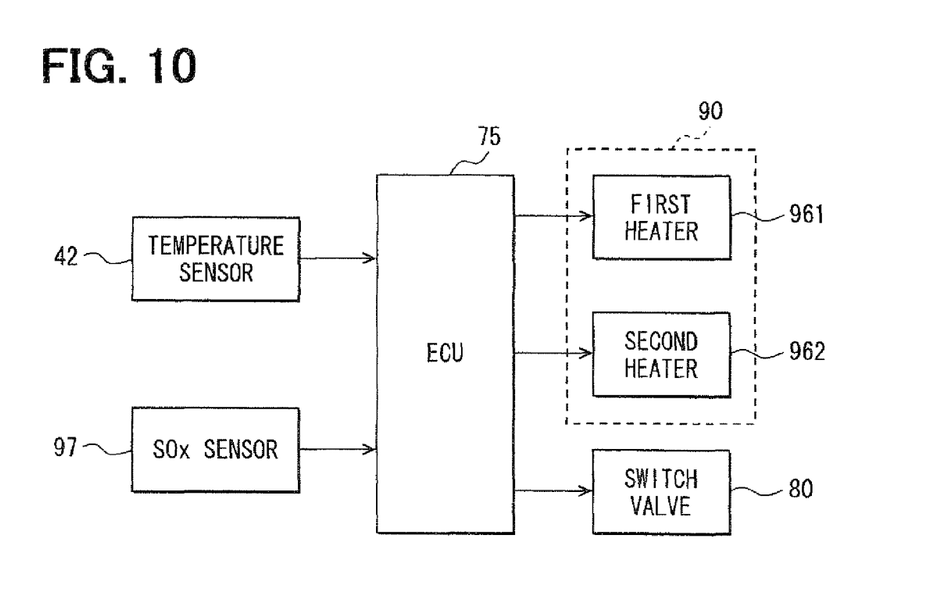
FIG. 10 is a block diagram showing a configuration of the exhaust gas purification device according to the second embodiment of the present invention.

FIG. 9 is an enlarged schematic view of the first $SO_X$ adsorption portion 91. The first $SO_X$ adsorption portion 91 is configured to be a honey-comb structure, and a first $SO_X$ adsorption material 911 is supported by a support member 915 to form the first $SO_X$ adsorption portion 91. Similarly, the second $SO_X$ adsorption portion 92 is configured to be a honey-comb structure, and a second $SO_X$ adsorption material 921 is supported by a support member 925 to form the second $SO_X$ adsorption portion 92. As shown in FIG. 10, sensors such as the temperature sensor 42 and a $SO_X$ sensor 97 are connected to the input side of an ECU 75, and a first heater 961, a second heater 962, the switch valve 80 and the like are connected to the output side of the ECU 75.

In the present embodiment, the first $SO_X$ adsorption material 911 adsorbs $SO_X$ in the exhaust gas when the exhaust gas temperature is lower than 500° C., and the first $SO_X$ adsorption material 911 does not desorb $SO_X$ even when the exhaust gas temperature is equal to or higher than 500° C. The second $SO_X$ adsorption material 921 adsorbs $SO_X$ in the exhaust gas when the exhaust gas temperature is equal to or higher than 500° C. The second $SO_X$ adsorption material 921 is set to sufficiently store therein $SO_X$ even when the exhaust gas temperature is decreased to be such as lower than 500° C. Even when a running distance of a vehicle reaches 200000 km, for example, the second $SO_X$ adsorption material 921 can sufficiently adsorb $SO_X$. In the present embodiment, the first $SO_X$ adsorption material 911 is calcium oxide, and the second $SO_X$ adsorption material 921 is calcium carbonate.

Figure 11:
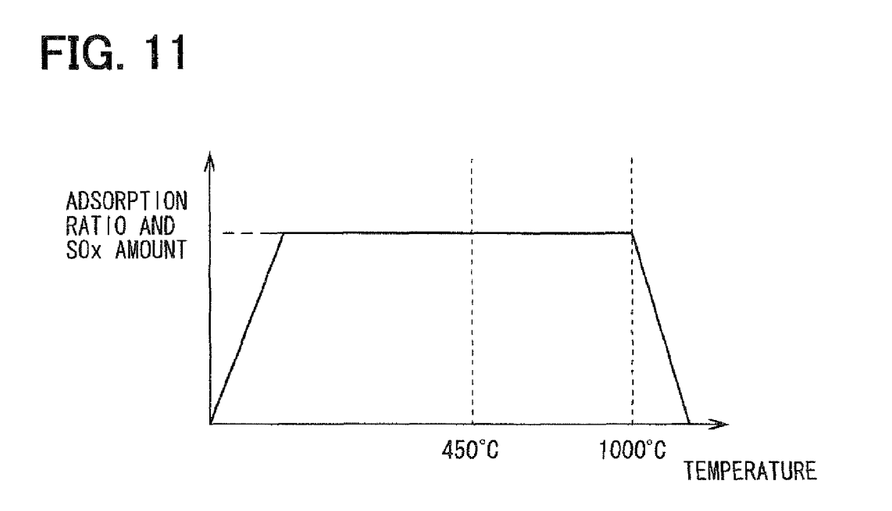
FIG. 11 is a graph showing a property of a first $SO_X$ adsorption material according to the second embodiment of the present invention.

$SO_X$ adsorption property of the $SO_X$ adsorption materials will be described with reference to FIG. 11 and FIG. 12. FIG. 11 is a graph showing the $SO_X$ adsorption property of the first $SO_X$ adsorption material 911. In FIG. 11, the horizontal axis indicates a temperature, and the vertical axis indicates a $SO_X$ adsorption ratio of the first $SO_X$ adsorption material 911 in the exhaust gas when the temperature of the first $SO_X$ adsorption material 911 is increased, and the amount of $SO_X$ stored in the first $SO_X$ adsorption material 911 when the temperature of the first $SO_X$ adsorption material 911 is decreased. As shown by the solid line in FIG. 11, the first $SO_X$ adsorption material 911 adsorbs $SO_X$ efficiently at a temperature lower than 450° C., and the $SO_X$ adsorption ratio is not decreased at a temperature equal to or higher than 450° C. As shown by the two-dot chain line in FIG. 11, the first $SO_X$ adsorption material 911 does not desorb $SO_X$ but stores $SO_X$ even when the temperature is decreased.

Figure 12:
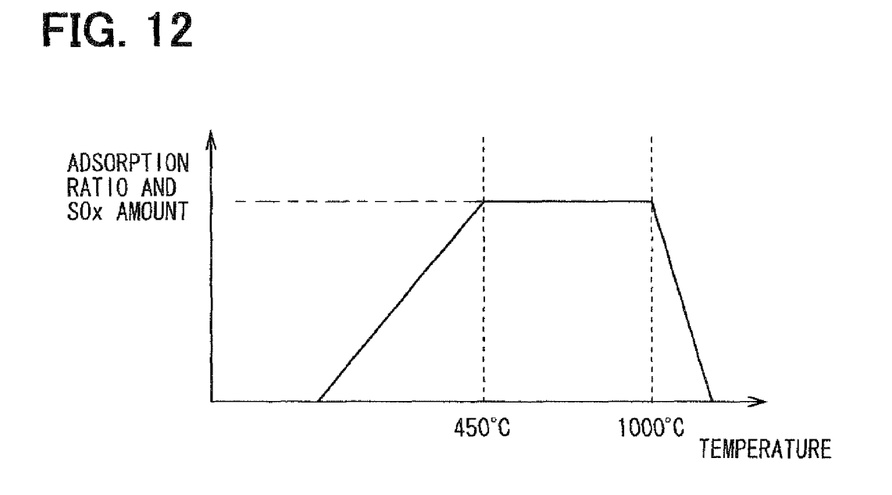
FIG. 12 is a graph showing a property of a second $SO_X$ adsorption material according to the second embodiment of the present invention.

FIG. 12 is a graph showing the $SO_X$ adsorption property of the second $SO_X$ adsorption material 921. In FIG. 12, the horizontal axis indicates a temperature, and the vertical axis indicates a $SO_X$ adsorption ratio of the second $SO_X$ adsorption material 921 in the exhaust gas when the temperature of the second $SO_X$ adsorption material 921 is increased, and the amount of $SO_X$ stored in the second $SO_X$ adsorption material 921 when the temperature of the second $SO_X$ adsorption material 921 is decreased. As shown by the solid line in FIG. 12, the second $SO_X$ adsorption material 921 adsorbs $SO_X$ efficiently at a temperature equal to or higher than 450° C., and the $SO_X$ adsorption ratio is decreased at a temperature equal to or higher than 1000° C. Because an upper limit of the exhaust gas temperature is generally about 700° C., the second $SO_X$ adsorption material 921 adsorbs $SO_X$ efficiently when the exhaust gas temperature is high. As shown by the two-dot chain line, the second $SO_X$ adsorption material 921 after adsorbing $SO_X$ at a temperature from 450° C. to 1000° C. does not desorb $SO_X$ but stores therein $SO_X$ even when the temperature is decreased to be lower than 450° C.

Figure 13:
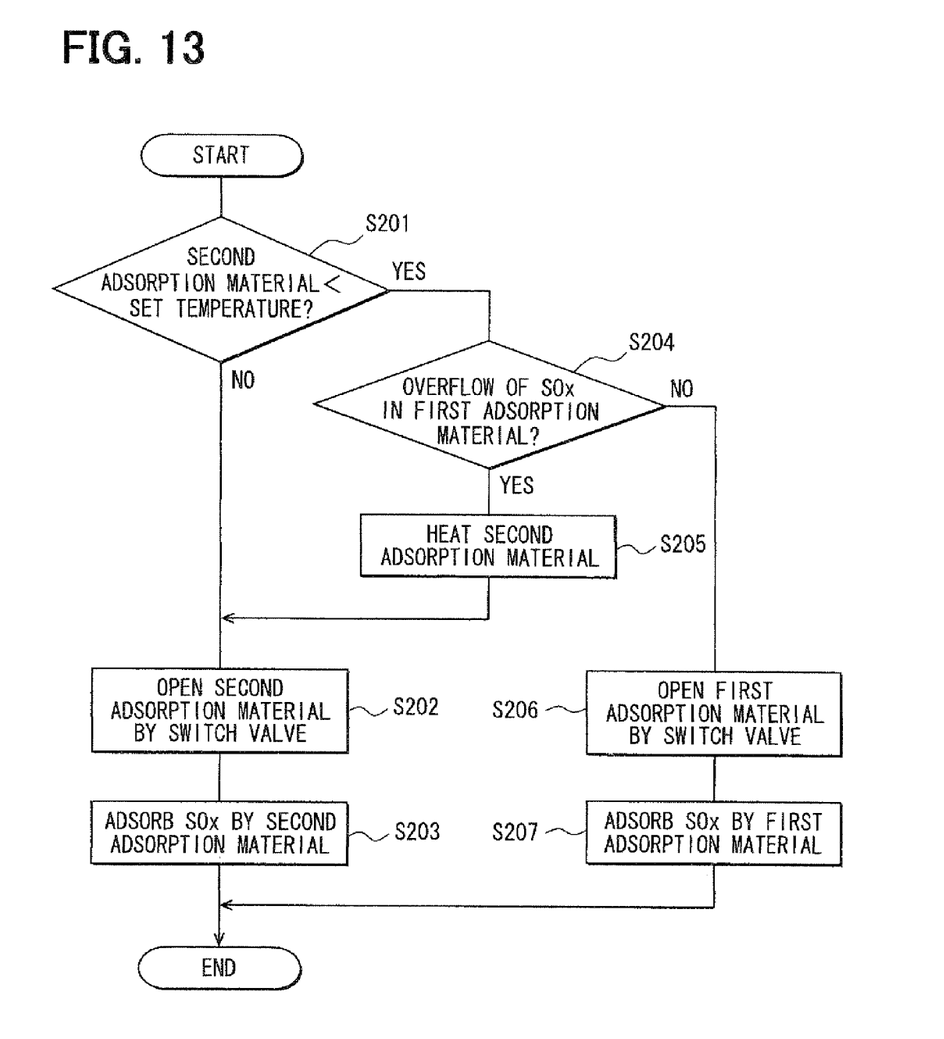
FIG. 13 is a flow diagram for a $SO_X$ adsorption treatment by the exhaust gas purification device according to the second embodiment of the present invention.

According to the present embodiment, the first $SO_X$ adsorption portion 91 and the second $SO_X$ adsorption portion 92 are arranged in parallel in the flow direction of the exhaust gas and the operation of the exhaust gas purification device 2 is controlled by the switch valve 80. The $SO_X$ adsorption treatment by the exhaust gas purification device 2 of the present embodiment will be described with reference to a flow diagram shown in FIG. 13. In FIG. 13, "S" indicates a step. At S201, it is determined whether the temperature of the second $SO_X$ adsorption material 921 is lower than a set temperature. The set temperature in the present embodiment is 500° C., for example. When the temperature of the second $SO_X$ adsorption material 921 is not lower than the set temperature ("NO" at S201), the control process proceeds to S202. When the temperature of the second $SO_X$ adsorption material 921 is tower than the set temperature ("YES" at S201), the control process proceeds to S204.

At S204, it is determined whether $SO_X$ overflows in the first $SO_X$ adsorption material 911. When the overflow of $SO_X$ in the first $SO_X$ adsorption material 911 is determined ("YES" at S204), the control process proceeds to S205. When the overflow of $SO_X$ in the first $SO_X$ adsorption material 911 is not determined ("NO" at S204), the control process proceeds to S206.

At S205, the second $SO_X$ adsorption material 921 is heated to be equal to or higher than the set temperature. After the temperature of the second $SO_X$ adsorption material 921 is heated to be equal to or higher than the set temperature at S205 and when the temperature of the second $SO_X$ adsorption material 921 is not lower than the set temperature at S201, the switch valve 80 is controlled such that the second branch pipe 403 located at a side of the second $SO_X$ adsorption material 921 is opened. In S203, $SO_X$ in the exhaust gas is adsorbed by the second $SO_X$ adsorption material 921, and then the $SO_X$ adsorption treatment is terminated.

When the temperature of the second $SO_X$ adsorption material 921 is lower than the set temperature at S201, and when the overflow of $SO_X$ in the first $SO_X$ adsorption material 911 is not determined at S204, the switch valve 80 is controlled such that the first branch pipe 401 located at a side of the first $SO_X$ adsorption material 911 is opened. At S207, $SO_X$ in the exhaust gas is adsorbed by the first $SO_X$ adsorption material 911, and then the $SO_X$ adsorption treatment is terminated.

The ECU 75 of the present embodiment configures a temperature control portion and a switch valve control portion. S205 in FIG. 13 corresponds to the control process performed by the temperature control portion and S202 and S206 in FIG. 13 correspond to the control processes by the switch valve control portion. As described above, in the present embodiment, by controlling the switch valve 80, $SO_X$ in the exhaust gas is adsorbed by the first $SO_X$ adsorption material 911 when the exhaust gas temperature is low, and $SO_X$ in the exhaust gas is adsorbed by the second $SO_X$ adsorption material 921 when the exhaust gas temperature is high.

When the overflow of $SO_X$ in the first $SO_X$ adsorption material 911 is determined at S204, the second $SO_X$ adsorption material 921 is heated at S205, the switch valve 80 is controlled such that the second branch pipe 403 is opened at S202, and $SO_X$ is adsorbed by the second $SO_X$ adsorption material 921 at S203.

Thereby, in case that the internal combustion engine 20 is a diesel engine and the exhaust gas temperature ranges from 100° C. to 700° C., by using both the first $SO_X$ adsorption material 911 and the second $SO_X$ adsorption material 921, $SO_X$ can be adsorbed efficiently. Therefore, the $NO_X$ catalyst 50 can be avoided from sulfur poisoning, and the lowering of the purification ability of the $NO_X$ catalyst 50 can be prevented.

In the present embodiment, calcium carbonate is used as the second $SO_X$ adsorption material 921. Calcium carbonate has high ability of adsorbing $SO_X$ under high temperature. In addition, calcium carbonate is stable, cheap, and has good recycling efficiency. However, $SO_X$ adsorbing efficiency of calcium carbonate decreases under low temperature. In the present invention, because the first $SO_X$ adsorption material that adsorbs $SO_X$ with high efficiency under low temperature is also used, the above-described difficulty can be overcome. Therefore, calcium carbonate can be used as the second $SO_X$ adsorption material.

Other Embodiments

Although an example that the exhaust gas purification device of the present invention is applied to a four-cylinder diesel engine has been described in the above embodiments, the number of cylinders in an internal combustion engine is not limited to four. In addition, the internal combustion engine is not limited to the diesel engine, and a direct-injection gasoline engine may be used. In addition, although a gear is used for transmitting driving force of a crankshaft to an inlet valve and an outlet valve, timing of opening and closing of the inlet valve and the outlet valve may be controlled by using a valve timing control device.

Figure 14:
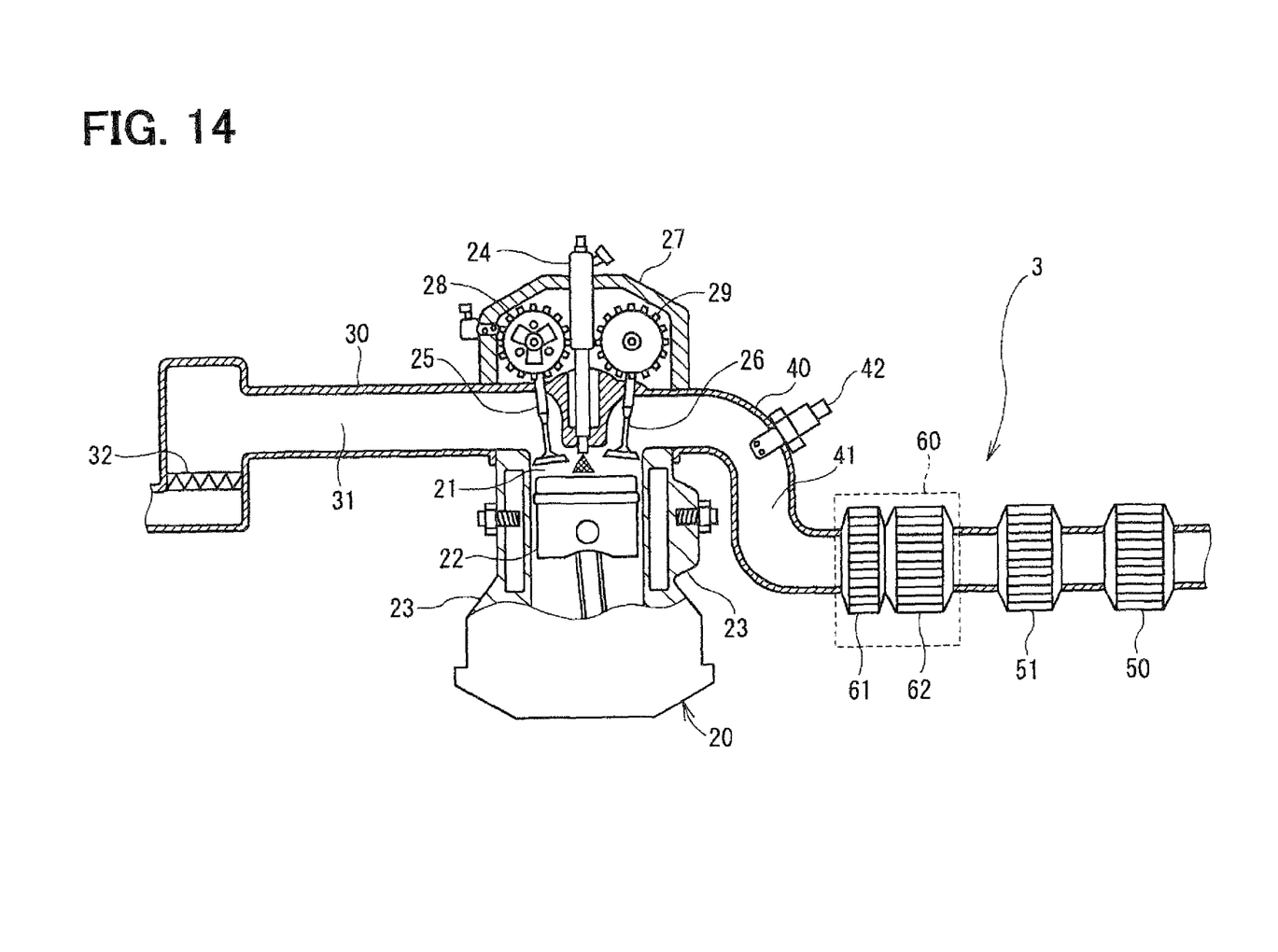
FIG. 14 is a cross-sectional view showing an exhaust gas purification device according to another embodiment of the present invention.

In the above embodiments, a $NO_X$ storage-reduction catalyst is used as a $NO_X$ catalyst. However, a DPF for trapping particles in exhaust gas may be used or an oxidation catalyst 51 may be provided upstream of a $NO_X$ catalyst 50 in an exhaust gas purification device 3 shown in FIG. 14. Furthermore, other catalysts or filters may be provided.

Figure 15:
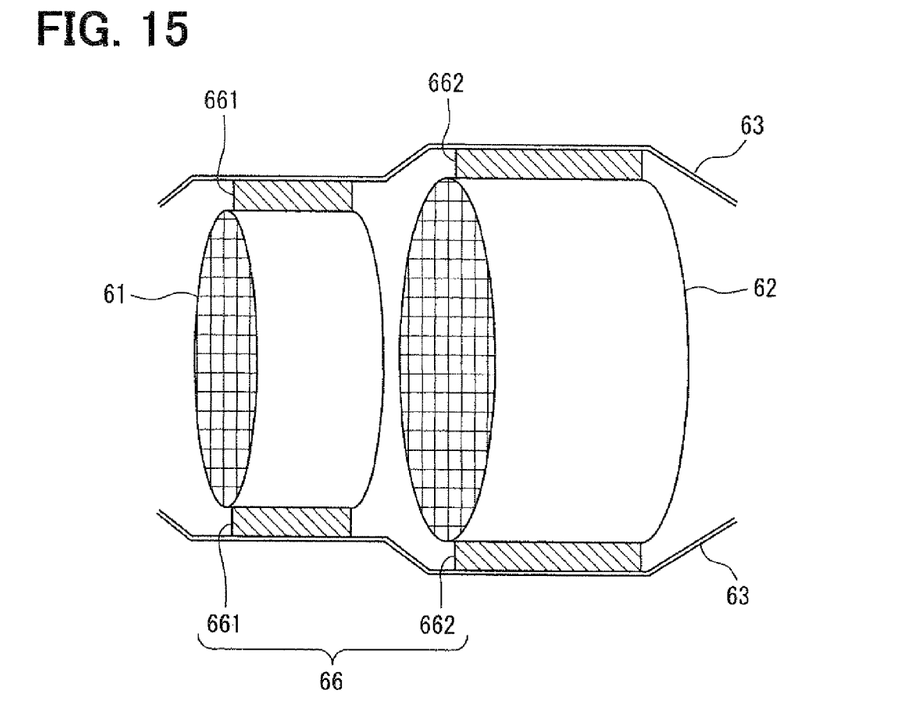
FIG. 15 is a schematic view showing a $SO_X$ adsorption portion used for an exhaust gas purification device according to another embodiment of the present invention.
Figure 16:
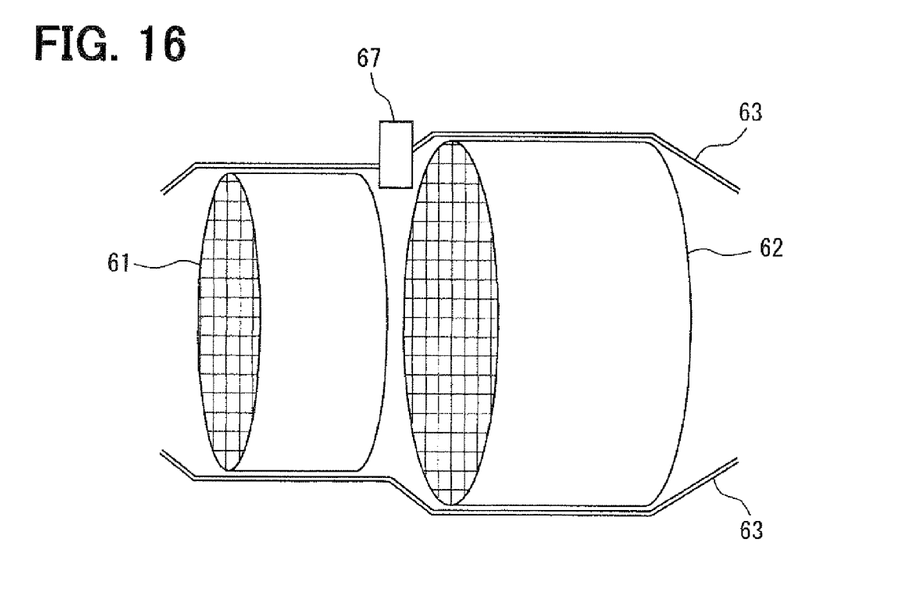
FIG. 16 is a schematic view showing a $SO_X$ adsorption portion used for an exhaust gas purification device according to another embodiment of the present invention.
Figure 17:
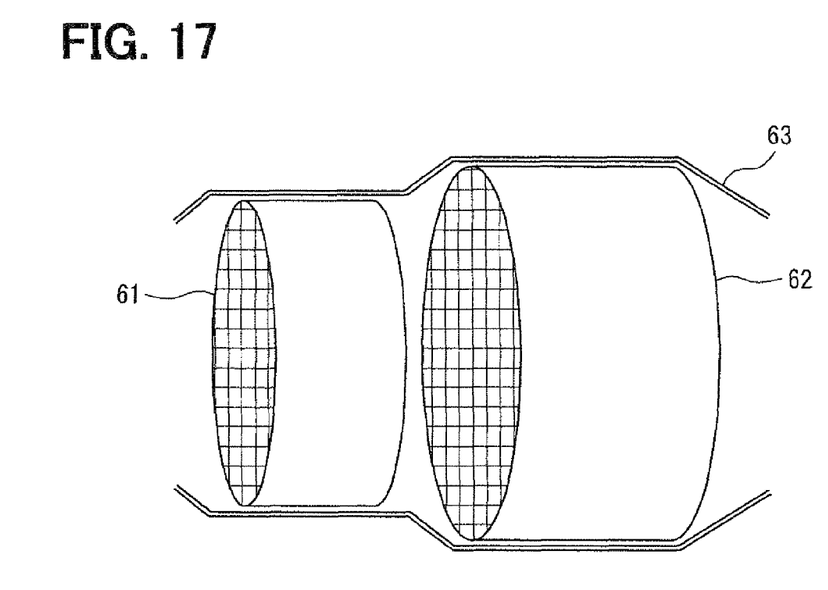
FIG. 17 is a schematic view showing a $SO_X$ adsorption portion used for an exhaust gas purification device according to another embodiment of the present invention.

In the above embodiments, a $SO_X$ sensor may not be provided in a $SO_X$ adsorption portion as shown in FIG. 15, a heater may not be provided in a $SO_X$ adsorption portion as shown in FIG. 16 or at least one of a first heater and a second heater may be provided. Furthermore, both the $SO_X$ sensor and the heater may not be provided as shown in FIG. 17. In the above embodiments, sodium compound or calcium oxide is used as the first $SO_X$ adsorption material. However, a material that can adsorb $SO_X$ under temperature lower than a set temperature, for example, alkaline metal or alkaline earth metal, may be used. In addition, a catalyst such as platinum and manganese catalyst may be added to alkaline metal or alkaline earth metal to improve the activity under low temperature. In particular, because a material having atomic weight lower than calcium reacts with $SO_X$ under low temperature and adsorbs $SO_X$, it is preferable to use the material.

As the first $SO_X$ adsorption material, compounds such as calcium oxide, calcium hydroxide or barium oxide may be used. In addition, a catalyst such as platinum and manganese catalyst may be added to calcium oxide, calcium hydroxide, barium oxide or calcium carbonate to improve the activity under low temperature. Furthermore, as the first $SO_X$ adsorption material, a material that includes microscopic pores on a surface thereof and adsorbs and holds $SO_X$ physically under relatively-low temperature, for example, activated carbon or zeolite, may be used. These materials as the first $SO_X$ adsorption material may be used singly or in combination.

In the above embodiments, calcium carbonate is used as the second $SO_X$ adsorption material. However, a material that can stores $SO_X$ under temperature higher than a set temperature and stores also under low temperature, for example, alkaline metal, alkaline earth metal, a compound of alkaline metal or a compound of alkaline earth metal, may be used. As the second $SO_X$ adsorption material, calcium oxide, calcium hydroxide or the like may be used. These materials as the second $SO_X$ adsorption material may be used singly or in combination. The amount of the second $SO_X$ adsorption material may be set such that $SO_X$ can be stored in the second $SO_X$ adsorption material even when a running distance of a vehicle reaches 200000 km, for example. Alternatively the second $SO_X$ adsorption material may be replaced regularly.

Although the set temperature is 500° C. as an example, in the above embodiments, the set temperature can be suitably changed in accordance with $SO_X$ adsorption property of materials that are used for the first $SO_X$ adsorption material and the second $SO_X$ adsorption material. For example, the set temperature is approximately from 350° C. to 500° C. The first set temperature may be different from the second set temperature. Alternatively, the first set temperature may be equal to the second set temperature. In the above embodiment, the first set temperature may be approximately 500° C. and the second set temperature may be approximately 350° C., for example.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An exhaust gas purification device comprising:
    an exhaust pipe defining an exhaust passage configured to discharge combustion gas from a combustion chamber of an internal combustion engine;
    a first $SO_x$ adsorption portion having a first $SO_x$ adsorption material, provided in the exhaust passage;
    a second $SO_x$ adsorption portion having a second $SO_x$ adsorption material, provided in the exhaust passage; and
    a $NO_x$ catalyst provided downstream of the first $SO_x$ adsorption portion and the second $SO_x$ adsorption portion in the exhaust passage, wherein
    the $NO_x$ catalyst is configured to absorb $NO_x$ in the combustion gas to purify the combustion gas,
    the first $SO_x$ adsorption material is configured to adsorb $SO_x$ in the combustion gas at a temperature lower than a first set temperature,
    the second $SO_x$ adsorption material is configured to store $SO_x$ in the combustion gas at a temperature equal to or higher than a second set temperature, and is capable of keeping the stored $SO_x$ at a temperature lower than the second set temperature, and
    a first heating portion configured to heat the first $SO_x$ adsorption material; and
    a first temperature control portion configured to control the first heating portion so as to cause the first $SO_x$ adsorption material to be heated when $SO_x$ overflows in the first $SO_x$ adsorption material.

2. The exhaust gas purification device according to claim 1, wherein the first $SO_x$ adsorption material includes at least one of alkaline metal and alkaline earth metal.

3. The exhaust gas purification device according to claim 1, wherein the first $SO_x$ adsorption material includes a material obtained by adding platinum or manganese catalyst to at least one of alkaline metal and alkaline earth metal.

4. The exhaust gas purification device according to claim 1, wherein the first $SO_x$ adsorption material includes at least one of activated carbon and zeolite.

5. The exhaust gas purification device according to claim 1, wherein the first $SO_x$ adsorption material includes at least one of calcium oxide, calcium hydroxide and barium oxide.

6. The exhaust gas purification device according to claim 1, wherein
the first $SO_x$ adsorption material includes a material obtained by adding platinum or manganese catalyst to at least one of calcium oxide, calcium hydroxide, barium oxide and calcium carbonate.

7. The exhaust gas purification device according to claim 1, wherein
the second $SO_x$ adsorption material includes at least one of alkaline metal, alkaline earth metal, a compound of alkaline metal and a compound of alkaline earth metal.

8. The exhaust gas purification device according to claim 7, wherein
the compound of alkaline earth metal is calcium carbonate.

9. The exhaust gas purification device according to claim 1, further comprising:
a second heating portion configured to heat the second $SO_x$ adsorption material; and
a second temperature control portion configured to control the second heating portion so as to cause the second $SO_x$ adsorption material to be heated when the second $SO_x$ adsorption material is lower than the second set temperature.

10. An exhaust gas purification device comprising:
an exhaust pipe defining an exhaust passage configured to discharge combustion gas from a combustion chamber of an internal combustion engine;
a first $SO_x$ adsorption portion having a first $SO_x$ adsorption material, provided in the exhaust passage;
a second $SO_x$ adsorption portion having a second $SO_x$ adsorption material, provided in the exhaust passage; and
a $NO_x$ catalyst provided downstream of the first $SO_x$ adsorption portion and the second $SO_x$ adsorption portion in the exhaust passage, wherein
the $NO_x$ catalyst is configured to absorb $NO_x$ in the combustion gas to purify the combustion gas,
the first $SO_x$ adsorption material is configured to adsorb $SO_x$ in the combustion gas at a temperature lower than a first set temperature,
the second $SO_x$ adsorption material is configured to store $SO_x$ in the combustion gas at a temperature equal to or higher than a second set temperature, and is capable of keeping the stored $SO_x$ at a temperature lower than the second set temperature;
a heating portion configured to heat the second $SO_x$ adsorption material; and
a temperature control portion configured to control the heating portion so as to cause the second $SO_x$ adsorption material to be heated when the second $SO_x$ adsorption material is lower than the second set temperature.

11. The exhaust gas purification device according to claim 1, wherein
the first $SO_x$ adsorption portion is provided upstream of the second $SO_x$ adsorption portion in a flow direction of the combustion gas.

12. The exhaust gas purification device according to claim 1, further comprising:
a switch valve provided upstream of the first $SO_x$ adsorption portion and the second $SO_x$ adsorption portion, wherein
the first $SO_x$ adsorption portion and the second $SO_x$ adsorption portion are provided in parallel in a flow direction of the combustion gas, and
the switch valve is configured to selectively open and close the first $SO_x$ adsorption portion and the second $SO_x$ adsorption portion.

13. An exhaust gas purification device comprising:
an exhaust pipe defining an exhaust passage configured to discharge combustion gas from a combustion chamber of an internal combustion engine;
a first $SO_x$ adsorption portion having a first $SO_x$ adsorption material, provided in the exhaust passage;
a second $SO_x$ adsorption portion having a second $SO_x$ adsorption material, provided in the exhaust passage; and
a $NO_x$ catalyst provided downstream of the first $SO_x$ adsorption portion and the second $SO_x$ adsorption portion in the exhaust passage, wherein
the $NO_x$ catalyst is configured to absorb $NO_x$ in the combustion gas to purify the combustion gas,
the first $SO_x$ adsorption material is configured to adsorb $SO_x$ in the combustion gas at a temperature lower than a first set temperature,
the second $SO_x$ adsorption material is configured to store $SO_x$ in the combustion gas at a temperature equal to or higher than a second set temperature, and is capable of keeping the stored $SO_x$ at a temperature lower than the second set temperature, and
a switch valve provided upstream of the first $SO_x$ adsorption portion and the second $SO_x$ adsorption portion, wherein
the first $SO_x$ adsorption portion and the second $SO_x$ adsorption portion are provided in parallel in a flow direction of the combustion gas, and
the switch valve is configured to selectively open and close the first $SO_x$ adsorption portion and the second $SO_x$ adsorption portion; and
a valve control portion configured to control the switch valve, wherein
in case that the second $SO_x$ adsorbing member is lower than the second set temperature, the valve control portion controls the switch valve such that the first $SO_x$ X adsorption material adsorbs $SO_x$ in the combustion gas when $SO_x$ does not overflow in the first $SO_x$ adsorption material, and the second $SO_x$ adsorption material adsorbs $SO_x$ in the combustion gas when $SO_x$ overflows in the first $SO_x$ adsorption material.

14. The exhaust gas purification device according to claim 1, wherein the second set temperature is equal to or lower than the first set temperature.

* * * * *